United States Patent [19]

Von Holdt

[11] Patent Number: 4,808,106

[45] Date of Patent: Feb. 28, 1989

[54] FLEX GATE

[76] Inventor: John W. Von Holdt, 6864 Lexington La., Niles, Ill. 60648

[21] Appl. No.: 122,752

[22] Filed: Nov. 19, 1987

[51] Int. Cl.⁴ .......................................... B29C 45/38
[52] U.S. Cl. .................... 425/547; 137/854;
264/328.9; 264/328.14; 425/562; 425/563;
425/564; 425/566
[58] Field of Search ............................... 425/562–566,
425/567–573, 547, 549; 264/328.9, 328.15,
328.14; 137/854

[56] References Cited

U.S. PATENT DOCUMENTS

| | | | |
|---|---|---|---|
| 2,712,693 | 7/1955 | Comparette | 425/564 X |
| 3,231,149 | 1/1966 | Yuza | 137/854 X |
| 3,693,656 | 9/1972 | Sauer | 137/854 X |
| 4,171,941 | 10/1979 | Yotsutsuji et al. | 425/563 X |
| 4,268,240 | 5/1981 | Rees et al. | 425/566 X |
| 4,286,941 | 9/1981 | Gellert | 425/566 |
| 4,289,468 | 9/1981 | Von Holdt | 425/566 X |
| 4,289,473 | 9/1981 | Von Holdt | 264/328.9 X |
| 4,340,353 | 7/1982 | Mayer | 425/563 X |
| 4,380,422 | 4/1983 | Von Holdt | 425/562 X |
| 4,391,579 | 7/1983 | Morrison | 425/564 X |
| 4,394,117 | 7/1983 | Taylor | 425/564 X |
| 4,465,651 | 8/1984 | Godschalk, Jr. et al. | 264/328.9 X |
| 4,490,315 | 12/1984 | Charlebois et al. | 264/328.9 X |
| 4,579,147 | 4/1986 | Davies et al. | 137/854 |
| 4,579,520 | 4/1986 | Gellert | 425/566 X |
| 4,663,811 | 5/1987 | Gellert | 425/566 X |

Primary Examiner—Richard L. Chiesa
Attorney, Agent, or Firm—Charles F. Pigott, Jr.; Garrettson Ellis

[57] ABSTRACT

A mold comprises a molding chamber, a sprue aperture communicating with the chamber for introducing molding compound into the chamber, and a mold gate for regulating molding compound flow through the sprue aperture. In accordance with this invention, the mold gate comprises flexible flap means positioned to restrict flow of molding compound through the sprue aperture. The flap means is positioned to be flexed toward the molding chamber by pressurized molding compound, to permit increased flow of the molding compound through the sprue aperture into the molding chamber. The flap means is capable of returning to their original shape when the pressurized molding compound is substantially released of its pressure, particularly in the circumstance where a suction step in the molding compound pressure cycle provides a negative pressure. The flap means in its original shape at least substantially obstructs the sprue aperture.

18 Claims, 2 Drawing Sheets

FLEX GATE

BACKGROUND OF THE INVENTION

Mold gates of various designs are used to control the flow of molding compound into and out of a molding chamber through a sprue aperture in typical injection molds and the like. See for example Von Holdt U.S. Pat. Nos. 4,380,422; 4,289,468; and 4,289,473.

Various disadvantages accompany the various designs of prior art molds and their gates. For example, the mold gate structure of the previously cited U.S. Pat. No. 4,380,422 utilizes a longitudinal flexing system which is expensive and difficult to manufacture, and which also exhibits an undesirable amount of metal fatigue during operation which limits its useful life. The mold gate of U.S. Pat. No. 4,289,468 utilizes a pressure driven sliding member to open and close a mold gate, but it also exhibits a tendency to stick during operation because of the seepage of molding compound between the sliding surfaces of the sliding plunger used therein and the bore that retained it. Finally, the mold of U.S. Pat. No. 4,289,473 exhibits no means at all for preventing back flow of molding compound out of the molding chamber, and in some circumstances generates weakened areas in the molded product immediately adjacent to the mold gate.

In accordance with this invention, a mold gate is provided which overcomes the above disadvantages, in that it is relatively inexpensive to manufacture, exhibits a long useful life with minimum metal fatigue caused by flexing, and which is substantially free of the possibility of failure to operate through sticking in position, because the mold gate can be free of sliding moving parts. Nevertheless, back flow of molding compound out of the molding chamber or cavity may be controlled, for improved production of quality molded parts.

DESCRIPTION OF THE INVENTION

In this invention, a mold gate is provided for use in a mold which comprises a molding chamber and a sprue aperture communicating with the chamber for introducing molding compound into the chamber. The mold gate, as is usual, regulates molding compound flow through the sprue aperture.

In accordance with this invention, the mold gate comprises flexible flap means positioned to restrict flow of molding compound through the sprue aperture. The flap means is positioned to be flexed toward the molding chamber by pressurized molding compound, to permit increased flow of the molding compound through the sprue aperture into the molding chamber. The flap means is capable of resuming its original shape when the pressurized molding compound is substantially released of its pressure. The flap means in its original shape at least substantially obstructs the sprue aperture.

The mold gate of this invention is preferably free of sliding moving parts, to greatly reduce the possibility of seeping molding compound disrupting the mold gate operation by entering into a sliding area present.

The flap means preferably defines a free, flow regulating, movable flex edge which defines at least the majority of a substantially annular path. Thus, molding compound can flow through the mold gate in a multidirectional flow pattern, radially outwardly therefrom, for a reduction of shear imposed on the molding compound, to reduce the back pressure of the molding process and preserve the physical properties of the molding compound.

The flap means is typically carried by and extends radially outwardly from a central member positioned in the sprue aperture. The movable flex edge is typically at a radially outermost position of the flap means adjacent an end of a sleeve defining the sprue aperture. The flap means can then rest against the sleeve end in its original shape in the absence of pressurized molding compound or during a suction pressure step of molding compound in the molding cycle, to at least substantially obstruct flow through the sprue aperture.

Typically, the flap means may be spaced from the annular end in its original shape by no more than 0.05 inch, and typically 0.01 to 0.03 inch. Such spacing may be provided to the flap means in its original shape for thermal insulation thereof.

The mold gate of this invention may also define an outer sleeve, and a central member positioned within the outer sleeve, the sprue aperture extending through the central member. The flap means may be carried by the outer sleeve, if desired, the flap means defining a free, flow regulating, movable flex edge similar to that previously described, which edge is positionable to regulate the flow by relation with said central member. The flex edge preferably defines at least the majority of a substantially annular path.

Alternatively, the flap means may be carried by the central member. The flap means defines, as before, a free, flow regulating, movable flex edge which is positionable to regulate the flow by relation with the outer sleeve, and the flex edge preferably defines, as before, at least the majority of a substantially annular path.

The gate of this invention is a simple design that has preferably no sliding moving parts. Thus, it is essentially free of the possibility of malfunction, while requiring no maintenance. As an additional advantage, the mold gate of this invention is self-balancing when used in a multiple cavity molding apparatus.

It is also desirable for a substantially annular space to exist between the outer sleeve and central member described above. Such an annular space may communicate with the sprue aperture, so that molding compound may enter the annular space to provide thermal insulation of the sprue aperture during operation.

In another embodiment of this invention, a mold gate may be used for controlling flow through a sprue aperture in which the mold gate comprises plunger means proportioned to occlude flow through the sprue aperture in a first position, and to permit flow through the sprue aperture in a second position. The plunger means is carried by diaphragm means. The diaphragm means is positioned with one face exposed to a channel communicating with the sprue aperture, whereby the presence of pressurized molding compound in the sprue aperture results in a pressure in the channel, to cause the diaphragm means to deflect to place the plunger means into the second position. The absence of pressurized molding compound, or a suction pressure condition in the sprue aperture, causes the diaphragm means to place the plunger means into the first position.

Thus, such an apparatus provides spontaneous, pressure-responsive gating of mold cavities. Such a system may be self-balancing in a multiple cavity mold and provides other significant advantages.

The plunger means may be carried at one end on the diaphragm means, and the other end of the plunger means occludes flow through the sprue aperture in the first position at a gate aperture which is positioned immediately adjacent the molding chamber. Additionally, spring means may be provided to urge the diaphragm and plunger means toward said first position.

DESCRIPTION OF DRAWINGS

In the drawings.

FIG. 2 is a transverse sectional view taken along line 2—2 of FIG. 1a;

FIG. 5 is a sectional view taken along line 5—5 of FIG. 4a;

FIG. 8 is a sectional view taken along line 8—8 of FIG. 7a.

DESCRIPTION OF SPECIFIC EMBODIMENTS

Figure 1A:
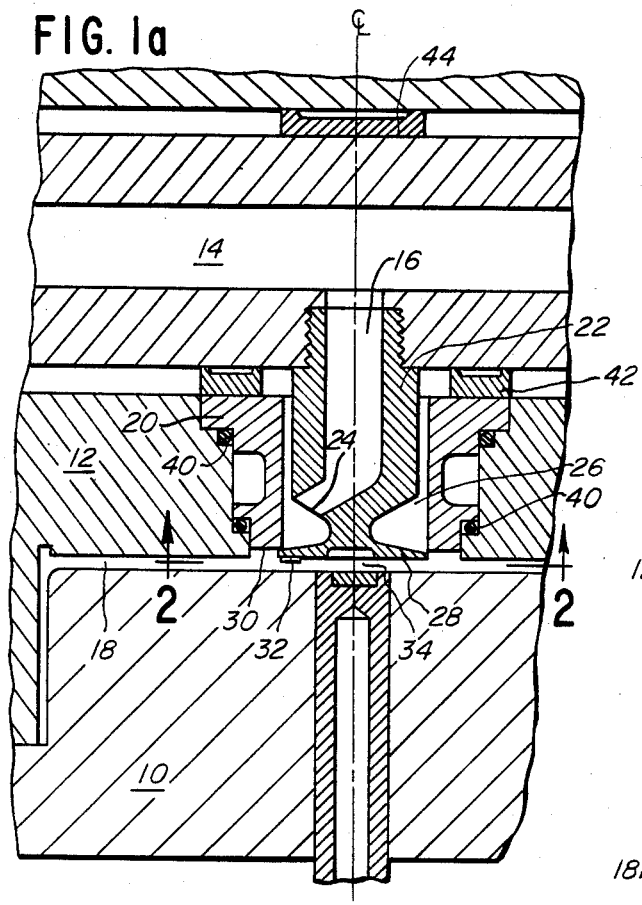
FIG. 1a is a longitudinal sectional view of a mold having a sprue aperture and a mold gate in accordance with this invention, shown with the mold gate in closed position.
Figure 1B:
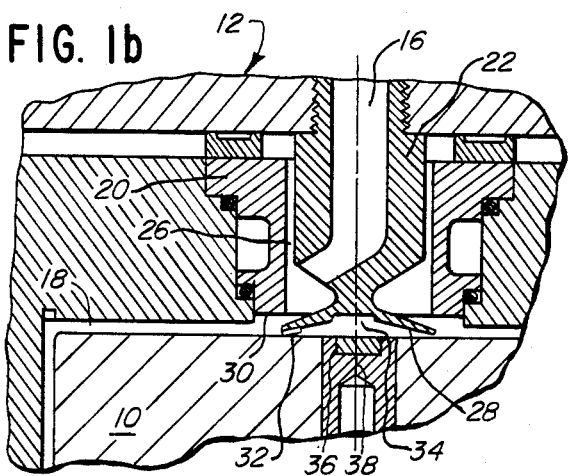
FIG. 1b is a sectional view similar to FIG. 1a showing the mold gate in open position.
Figures 2, 5:
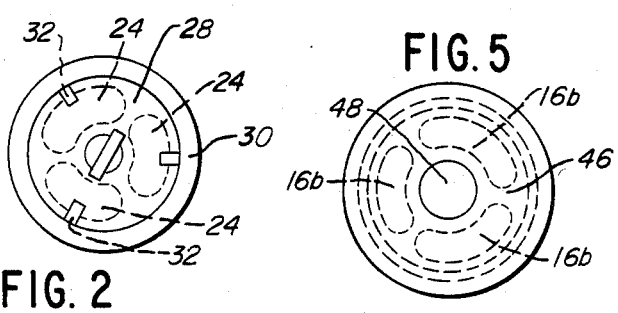

Referring to FIGS. 1 and 2, a portion of a multiple cavity injection mold system is disclosed including multiple mold core 10 and multiple mold cavity 12, which may be of conventional design except as otherwise disclosed herein. Mold cavity 12 defines a runner conduit system 14 for providing heated molding compound to each sprue aperture 16. The molton molding compound passes through sprue aperture 16 into molding chamber or cavity 18, which is specifically shown in this embodiment to be of the shape of an inverted, molded container.

In accordance with this invention, a mold gate is provided which, in this embodiment, defines sprue aperture 16 and controls flow through it. The mold gate comprises an outer sleeve member 20 and a central member 22 which is positioned within outer sleeve 20. As shown in FIGS. 1a and 1b, sprue aperture 16 extends through central member 22, dividing in its lower end into three branching lateral channels 24, which communicate with a substantially annular space 26 positioned between outer sleeve 20 and central member 22. Accordingly, as molding compound enters annular space 26 through sprue 16, it can flow upwardly to surround most of central member 22 to provide thermal insulation to sprue aperture 16. The effect of this added insulation is to reduce the cooling rate of the molten molding compound passing therethrough.

FIG. 1 shows the lower end of central member 22 to define an annular flap 28, which may be made of flexible spring steel or the like. As shown in FIG. 1a, flap 28 in its normal position rests against the lower end 30 of outer sleeve 20. In this position, pressurized molding compound in mold cavity 18 cannot flow backwards to any significant extent out of the mold cavity during the cooling process. Also, of course, molding compound cannot flow into the cavity.

However, as shown in FIG. 1b, when molten molding compound at a pressure above a given level passes from runner system 14 into sprue 16, the pressure of the molding compound causes annular flap 28 to flex toward molding chamber or cavity 18 as shown, driven by the pressurized molding compound, to permit increased flow of the molding compound through the sprue aperture into molding chamber 18. When the pressure of molding compound has equalized between molding chamber 18 and sprue 16, flap 28 will tend to retract from its extended, open position of FIG. 1b toward its closed position of FIG. 1a. Particularly in a molding cycle where a brief suction pressure is provided from runner system 14 into sprue 16, the differential pressure in mold cavity 18 over the reduced pressure in sprue 16 will cause flap 28 to be driven into closed position, to prevent counter flow of molding compound out of cavity 18.

Accordingly, the mold gate of this invention operates without moving parts, except for the flex action of flap 28, to provide increased insurance that the gate of this invention will operate for an indefinite period without malfunction or need of maintenance. It could be noted by a comparison of FIGS. 1a and 1b that the amount of flex that flap 28 must go through is fairly minimal, so that metal fatigue is not a problem.

Also, the molten molding compound can be seen to be capable of entering mold cavity 18 between flap 28 and end 30 in a flow path which is substantially radial about a full circle. This permits significantly faster filling of cavity 18 with less temperature elevation and shear imposed upon the molding compound, and with correspondingly less degradation of the molding compound. This type of mold gate can also provide improved uniformity of density throughout various sections of the object molded in cavity 18 because of the improved filling time, which causes the molding compound to be less viscous as filling of cavity 18 is completed.

Optional studs 32 may be provided to assure that the section 34 of mold cavity 18 is not sealed off by the deflected flap 28 during the time that the molding compound is pressurized.

Also, porous insert 36 may be provided to permit the venting of air through hole 38 from area 34 as cavity 18 is filled, without molding compound getting into hole 38.

The remaining portions of the mold of FIGS. 1 and 2 are conventional. Conventional O-ring seals 40, compression seals 42, 44, and other standard parts may be utilized in accordance with the current state of the art.

Figure 3:
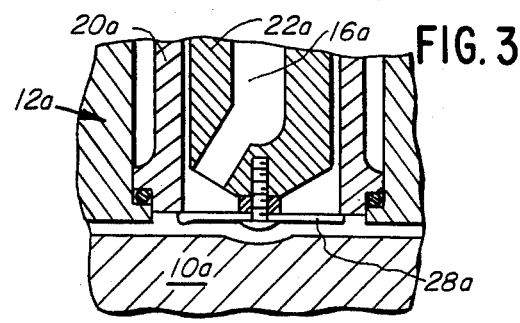
FIG. 3 is a fragmentary longitudinal sectional view of a modified embodiment of mold gate.

Turning to FIG. 3, a fragmentary view of mold core 10a and mold cavity 12a is shown. As before, the valve gate defines an outer sleeve 20a and a central member 22a, through which sprue 16a extends. This embodiment shows a slight modification in which a circular flap member 28a is bolted to central member 22a, to perform in a manner similar to the embodiment of FIGS. 1 and 2.

Figure 4A:
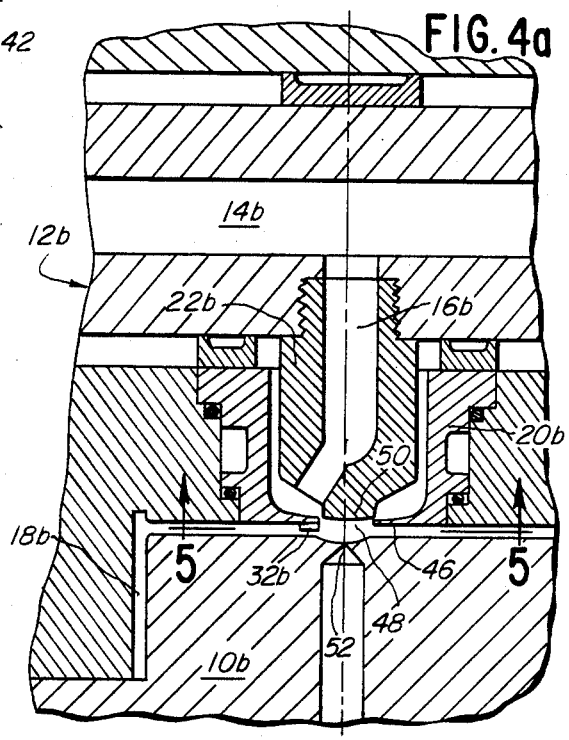
FIG. 4a is a longitudinal sectional view of a portion of a mold showing another embodiment of mold gate in accordance with this invention, with the gate in closed position.

Turning to FIGS. 4a through 5, another embodiment of the invention of this application is disclosed. As before, mold core 10e and mold cavity 12b cooperate together to form a molding chamber 18b, as is conventional. A runner system 14b provides molten molding compound to sprue aperture 16b, which in this embodiment also is defined in a central member 22b, which central member is surrounded by an outer sleeve 20b.

However, in this embodiment, annular flap 46 is carried by outer sleeve 20b rather than central member 22b. Flap 46 defines an aperture 48, and normally rests against or immediately adjacent the lower end 50 of central member 22b. If desired, radial slits may be placed in flap 46 to increase its deflection in the presence of pressurized molding compound.

Figure 4B:
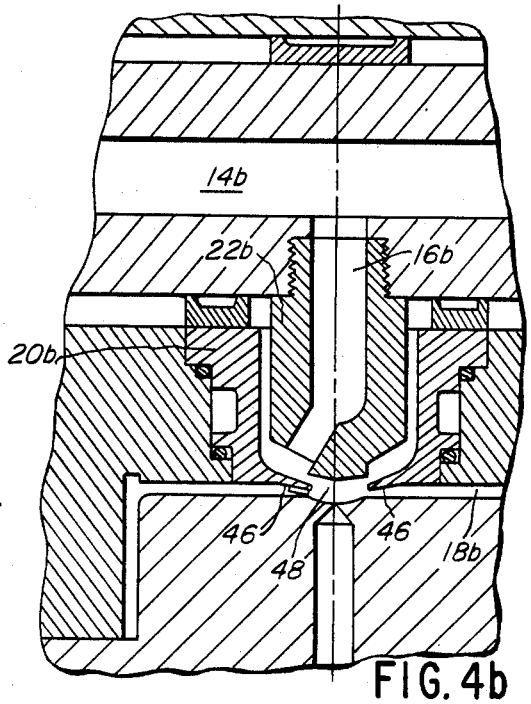
FIG. 4b is a corresponding sectional view showing the mold gate of FIG. 4a in opened position.

When pressurized molding compound occupies sprue aperture 16b, flap member 46 is flexed toward molding chamber 18b to open access for molding compound into the molding chamber, as shown in FIG. 4b. When the pressure on the molding compound within sprue aperture 16b is reduced, flap member 46 returns to its closed configuration as in FIG. 4a, preventing substantial counterflow of molding compound out of mold cavity 18.

As in previous embodiments, one or more optional studs 32b may be placed upon flat member 46, to assure good and complete flow of molding compound. If desired, pin hole vent 52 may be provided.

The remaining parts shown in this embodiment are similar to those of the previous embodiment, and their specific selection of design and functioning is well known to those skilled in the art.

Figure 6:
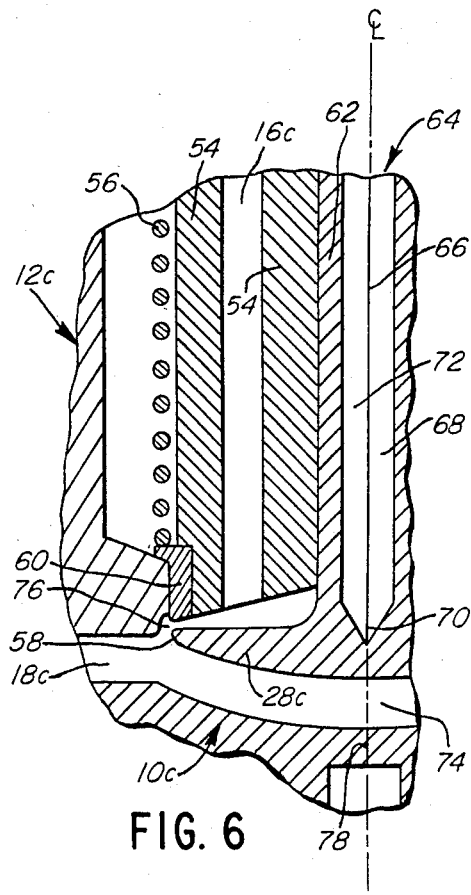
FIG. 6 is a fragmentary longitudinal sectional perspective view of another embodiment of mold gate in accordance with this invention.

Turning now to FIG. 6, an enlarged, fragmentary sectional view of another embodiment of this invention is disclosed, such embodiment being substantially similar in design to that of FIG. 1 except as otherwise shown herein.

As before, mold core 10c, which may be either single or multiple, interacts with mold cavity 12c to define a molding chamber 18c as in the previous embodiment. One or more sprue aperture conduits 16c are provided in a mold gate housing 54, which is heated by a resistance wire coil 56.

Flap means 28c may define a circular periphery 58, which is normally spaced from an annular thermal insulating member 60 in the unstressed configuration of flap 28c by typically about 0.001 to 0.003 inch or the like. Thus, the periphery of flap 28c is thermally insulated by the presence of hot molding compound at all times, to prevent the premature freezing of molding compound adjacent tip 58.

At the same time, flap 28c is carried on stem 62, which is immovably affixed within heated valve housing 54.

Stem 62 defines central bore 64, which is divided by barrier 66 so that cooling water can flow in conventional manner into bore 64 along a channel 68 defined in one side of barrier 66, to flow down to the lower tip 70 of stem 62, and then to pass upwardly through a channel 72 on the other side of barrier 66, carrying heat with it away from the mold.

Thus, flap 28c overall is cooled by thermal conduction and the cooling water provided in stem 62, while annular flex edge 58 remains as the hottest part of flap 28c. At the same time, molten molding compound entering sprue aperture 16c remains heated by the action of heating coil 56 and conduction through mold housing 54. As a result of this, the system may be thermally balanced so that as pressurized molding compound enters mold cavity 18c through sprue aperture 16c, deflecting flap 28c into cavity 18c by pressure as the flow proceeds, the molding shot takes place without undesirable freezing of molding compound adjacent flex edge 58. Nevertheless, when the shot is completed, and the molding compound is no longer pressurized in sprue aperture 16c, annular flex edge 58 retracts toward insulator 60 but typically does not quite touch it. This provides sufficient valving action to prevent an undue amount of molding compound from counterflowing back from cavity 18c to sprue aperture 16c.

At the same time, cooling of the molding compound at the central area 74 is accelerated by the fact that the majority of flap member 28c is cooled by the water cooling action described above.

When mold core 10c and cavity 12c are opened and the molded object removed, a thin, annular flash of molding compound will tear out of constricted, annular area 76 between flap 28c and insulator 60, and the system will be ready for another mold shot.

As before, pin hole vent means 78 may be provided to improve the quality of the bottom of the object molded in cavity 18c.

Figure 7A:
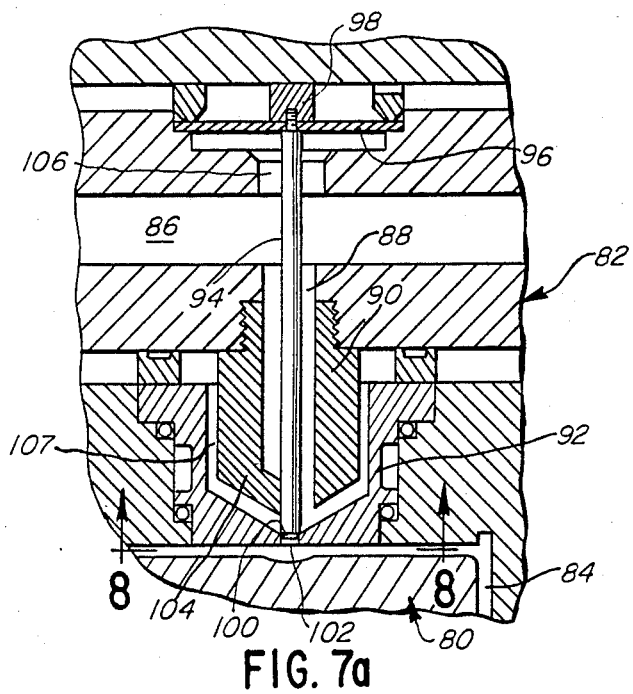
FIG. 7a is a longitudinal sectional view of yet another embodiment of mold gating system in accordance with this invention, shown in the closed position.
Figure 8:
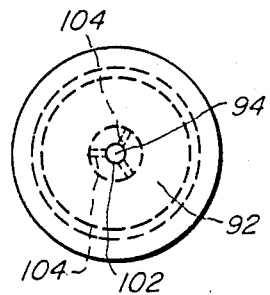
Figure 7B:
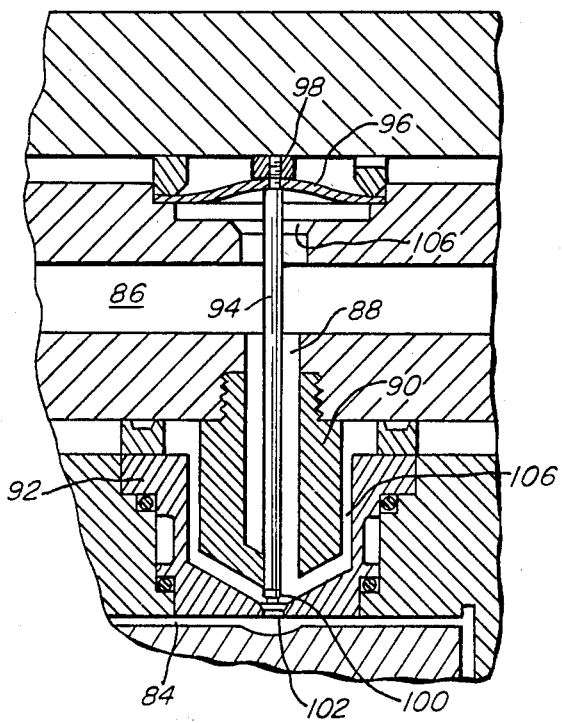
FIG. 7b is a sectional view similar to that of FIG. 7a showing the same mold gate in opened position.

Turning to FIGS. 7a and 7b, another embodiment of molding system utilizing a novel mold gate is disclosed. As before, mold core 80 and mold cavity 82 interact in generally conventional manner to define a molding chamber or cavity 84. Apart from the specific disclosures herein the mold of this embodiment operates in conventional manner. Conduit 86 provides molding compound to sprue aperture 88, which sprue aperture leads, in this particular embodiment, through a mold gate comprising a central aperture 90 and an outer sleeve 92.

Extending through sprue aperture 88 is a plunger 94 which is attached at one end to a diaphragm 96, sealed at its edges and backed with a central compression spring 98.

The forward end 100 of plunger 94 occludes, in the position of FIG. 7a, a gate aperture 102, so that flow through sprue aperture 88 is substantially prevented. Vanes 104 extend radially inwardly to support and position plunger 94.

When pressurized molding compound is provided to runner conduit 86 and sprue aperture 88, pressure is also sensed in channel 106, which serves to deflect diaphragm 96 rearwardly, compressing spring 98. This causes end 100 of plunger 94 to be withdrawn from gate aperture 102, so that molding compound may flow through gate aperture 102 into molding chamber 84. At the same time, annular chamber 107, which surrounds central member 90, may be filled with molding compound to assist in thermally insulating sprue aperture 88.

When the molding shot is completed, and the pressure in sprue aperture 88 is reduced, the pressure is correspondingly reduced in channel 106, causing diaphragm 96 to return from the configuration of FIG. 7b to the configuration of FIG. 7a. This causes the end 100 of plunger 94 to reenter into occluding relationship with gate aperture 102, assisted by the action of compression spring 98 if desired.

It can be seen that relatively small changes in the pressure in runner conduit 86 and sprue aperture 88 can cause a significant effect on the position of plunger 94 because of the relatively large area of diaphragm 96, against which the unbalanced pressure can press. The dimensioning of diaphragm 96 is one way that the operation of this apparatus can be controlled to provide desired performance.

Accordingly, by this invention a mold gate is provided which operates in a predetermined manner in response to the pressure of the molding compound in That which is claimed is:

1. In a mold gate for controlling flow between a molding chamber and a sprue aperture communicating with said chamber, said mold gate comprising flexible flap means positioned to restrict flow of molding compound through said sprue aperture, said flap means being positioned to be flexed toward said molding chamber by pressurized molding compound to permit increased flow of said molding compound through said sprue aperture into said molding chamber, said flap means being capable of resuming its original shape when said pressurized molding compound is substantially released of its pressure, said flap means in its original shape at least substantially obstructing said sprue aperture.

2. The mold gate of claim 1 which is free of sliding moving parts.

3. The mold gate of claim 1 in which said flap means defines a free flow regulating, movable flex edge of substantially annular shape, whereby molding compound can flow through said mold gate in a multidirectional flow pattern.

4. The mold gate of claim 3 in which said flap means is carried by and extends radially outwardly from a central member positioned in said sprue aperture, said movable flex edge being at a radially outwardmost position of said flap means adjacent an annular end of a sleeve defining said sprue aperture.

5. The mold gate of claim 4 in which said flap means rests against said annular end in its original shape.

6. The mold gate of claim 4 in which said flap means is apaced from said annular end in its original shape by no more than 0.05 inch.

7. The mold gate of claim 1 which defines an outer sleeve and a central member positioned within said outer sleeve, said sprue aperture extending through said central member.

8. The mold gate of claim 7 in which said flap means is carried by said outer sleeve, said flap means defining a free, flow regulating, movable inner flex edge positionable to regulate said flow by relation with said central member.

9. The mold gate of claim 8 in which said flex edge defines a substantially annular path.

10. The mold gate of claim 7 in which said flap means are carried by said central member, said flap means defining a free, flow regulating, movable flex edge positionable to regulate said flow by relation with said outer sleeve.

11. The mold gate of claim 10 in which said flex edge defines a substantially annular path.

12. The mold gate of claim 7 in which a substantially annular space exists between said outer sleeve and central member, said annular space communicating with said sprue aperture, whereby molding compound may enter said annular space to provide thermal insulation of said sprue aperture.

13. The mold gate of claim 1 in which said flap means is cooled by fluid cooling means.

14. In a mold gate for controlling flow between a molding chamber and a sprue aperture communicating with said chamber, said mold gate comprising flexible flap means positioned to restrict flow of molding compound through said sprue aperture, said flap means being positioned to be flexed towards said molding chamber by pressurized molding compound, to permit increased flow of said molding compound through said sprue aperture into said molding chamber, said flap means being capable of resuming its original shape when said pressurized molding compound is substantially released of its pressure, said flap means in its original shape at least substantially obstructing said sprue aperture, said flap means further defining a free, flow regulating, movable flex edge of substantially annular shape, whereby molding compound can flow through said mold gate in a multidirectional flow pattern, said mold gate defining an outer sleeve and a central member positioned within said outer sleeve, said sprue aperture extending through said central member.

15. The mold gate of claim 14 in which said flap means is cooled by fluid cooling means.

16. The mold gate of claim 15 in which said flap means is carried by and extends radially outwardly from said central member, said flap means defining said movable flex edge at a radially outwardmost position of said flap means adjacent an end of a sleeve defining said sprue aperture, said flap means being spaced from said sleeve end in its original shape by no more than 0.05 inch.

17. The mold gate of claim 16 which is free of sliding, moving parts.

18. The mold gate of claim 17 in which a substantially annular space exists between said outer sleeve and central member, said annular space communicating with said sprue aperture, whereby molding compound may enter said annular space to provide thermal insulation of said sprue aperture.

* * * * *